Nov. 30, 1926.
H. W. BERGMANN
VEHICLE WHEEL RIM FASTENER
Filed Feb. 24, 1926
1,609,108
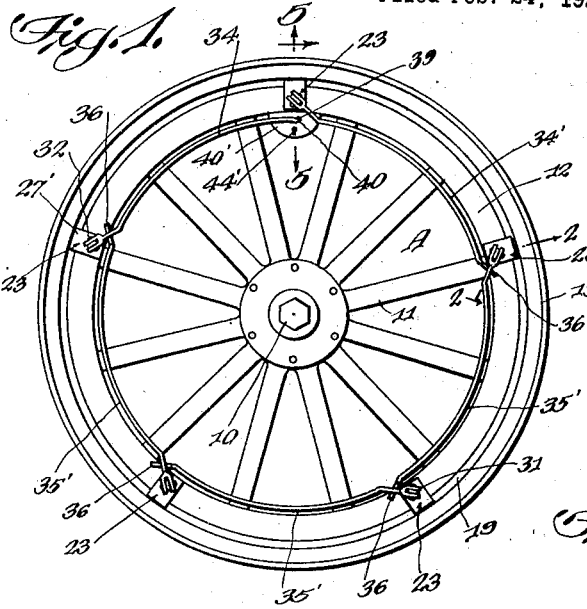
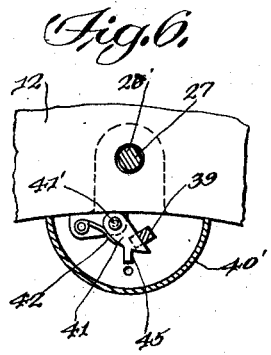
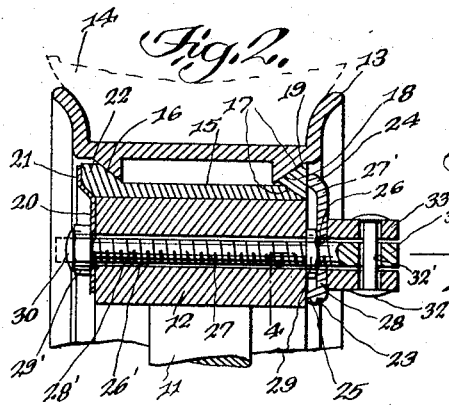
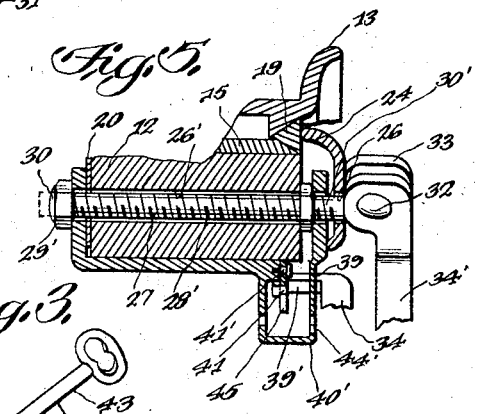
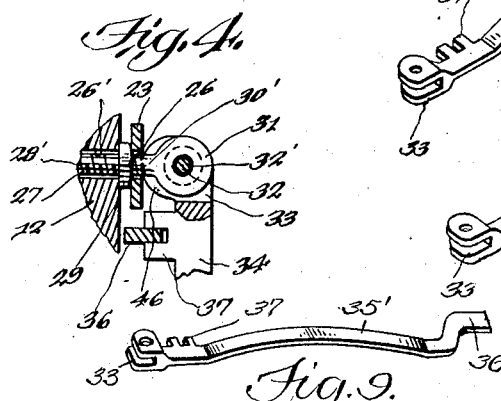
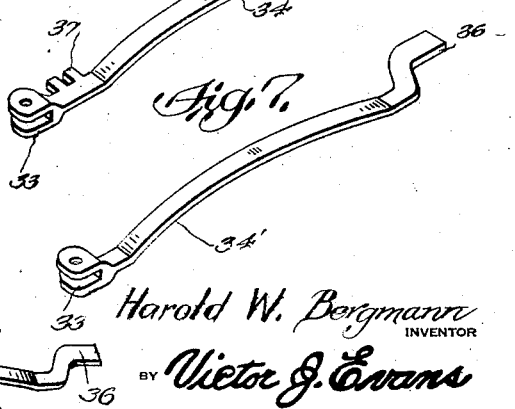
Harold W. Bergmann, INVENTOR
BY Victor J. Evans, ATTORNEY Patented Nov. 30, 1926.

1,609,108

UNITED STATES PATENT OFFICE.

HAROLD W. BERGMANN, OF CHICAGO, ILLINOIS.

VEHICLE WHEEL-RIM FASTENER.

Application filed February 24, 1926. Serial No. 90,395.

This invention relates to certain novel improvements in vehicle wheel rim fasteners and has for its principal object the production of a device of this character wherein an arrangement is provided permitting expeditious removal of the rim retaining ring of a vehicle wheel to permit removal of the tire rim with the tire thereon.

A further object of the invention is the production of a device of this character wherein an arrangement is provided for preventing removal of the tire carrying rim by unauthorized persons and wherein a simple arrangement is provided for locking the rim lugs of the vehicle wheel in retaining position retaining the rim ring thereon in position preventing removal of the tire carrying rim.

Other objects will appear hereinafter.

The invention consists in the combination and arrangement of parts hereinafter described and claimed.

The invention will be best understood by reference to the accompanying drawing showing the preferred form of construction and in which:

Fig. 1 is an elevational view of a vehicle wheel showing the invention associated therewith, Fig. 2 is a fragmentary sectional view of the same taken substantially on line 2—2 of Fig. 1, Fig. 3 is a perspective view of a key embodied in the invention, Fig. 4 is a fragmentary sectional view taken substantially on line 4—4 of Fig. 2, Fig. 5 is a fragmentary sectional view of the same taken substantially on line 5—5 of Fig. 1, Fig. 6 is a fragmentary view of the felly of a vehicle wheel illustrating a lock arrangement embodied in the invention associated therewith, Fig. 7 is a perspective view of one of the locking levers embodied in the invention, Fig. 8 is a perspective view of the main locking lever embodied in the invention, and Fig. 9 is a perspective view of another of the locking levers embodied in the invention.

In accomplishing the various objects of the invention I provide a vehicle wheel A including a hub 10, spokes 11 radially disposed about the hub and a felly 12 carried by the spokes. This felly is arranged and adapted to support a rim 13 carrying a tire 14 of known construction. The felly further carries a felly band 15 arranged to receive the rim 13. The felly band 15 and rim 13 are formed of the usual configuration providing bearing portions 16 facilitating aligning of the rim 13 with respect to the felly band 15. The rim and felly band further include tapered portions 17 providing an annular groove or recess 18 for the reception of a rim retaining ring 19 of the usual construction known in the art. The felly also carries a fixed ring 20 on one side thereof having a portion 21 in abutment with the adjacent circumferential edges 22 of the sub-rim preventing lateral displacement of this rim in the direction toward the ring.

The rim retaining ring 19 is held in retaining position through the medium of rim lugs 23 having inwardly turned portions 24 in bearing relation with the ring and opposite inwardly turned portions 25 in bearing relation with the adjacent side of the felly. These lugs have openings 26 formed therein adapted for registration with openings 26' formed transversely of the felly and in which retaining bolts 27 are adapted to be positioned.

The holes 26 formed in the lugs 23 are disposed below the horizontal central axis of the lugs so that the greater portions 27' of the lugs are contiguous of the rim retaining ring 19 whereby upon rotation of the lugs upon the bolts the lesser portions 28 will be disposed outwardly radially from the center of the vehicle wheel with the inturned portions 25 adjacent the side of the felly thus permitting unobstructed removal of the rim retaining ring at the proper time.

The bolts 27 have threaded shank portions 28' upon which are threaded nuts 29 adapted when threaded in position to be confined between the felly and the lugs. These bolts have other nuts 29' threaded thereon in a position for bearing relation with the felly opposite the nuts 29 and after these nuts have been threaded into proper position rivet heads 30 are formed on the shank portions 28' as illustrated in Fig. 2. It is apparent that by reason of the nuts and the rivet heads the bolts cannot be removed from their respective positions from the felly.

These bolts have their end portions 30' opposite the rivet heads enlarged providing bearings 31 for pintles 32 insertable through openings 32' formed in the enlarged portions. The bearing portions are adapted for insertion in the bifurcated ends 33 of the levers 34, 34', and 35' pivotally connected to the bolts through the medium of pintles 32.

These locking levers have curved body portions 35 conforming to the curvature of the felly and are adapted to be circumferentially disposed about the vehicle wheel contiguous of the felly in the manner best illustrated in Fig. 1. The locking lever 34' is similar in structure to the locking levers 35' as best illustrated in Fig. 7 and this locking lever 34' and the locking levers 35' each have their outer end portion offset relative to the curved body portion 35 and provided with a locking end 36. This locking end is adapted to be seated in locked position between spaced ears 37 formed on the preceding locking lever when the locking lever is in locking position. It is thus apparent that each locking lever is locked in locking position by the preceding locking lever with the exception of the locking lever 34 which constitutes the main locking lever because it is this lever which controls the locking relation between the other levers in a manner hereinafter more fully understood. This locking lever 34 has an angled end 39 providing a hook 39' which is adapted for insertion through an opening 40 formed in a wall of a lock casing 40' and when it is in this inserted position, it is locked against withdrawal through the medium of a latch 41 pivoted at 41' within the lock casing and urged into locking position by a spring member 42.

This latch 41 is operated upon by a key 43 to be moved from locking position. This key as illustrated in the drawing has a lateral projection 44 which, when inserted through the key hole 44' and operated, is adapted for engagement with a lug 45 formed as an integral part of the latch 41. Upon engagement of the key lug 44 with the latch lug 45 and upon operation of the key, the latch 41 is moved against the action of the spring 42 disengaging the latch from locked engagement with the hook end 39'.

It is apparent that when the locking end of the lever 34 is inserted into the lock casing that the locking relation between the latch and locking lever will automatically take place by reason of the spring member 42 which presses the latch into locking position.

The locking levers herein referred to control movement of the ring engaging portions of the lugs from bearing relation therewith. This is accomplished by providing cam edges 46 on the locking levers contiguous of their pivotal connection to the bolts 27. This arrangement is such that upon unlocking of these locking levers the same are pivoted about their pivotal connection moving the cam edges from wedging position against the rim lugs leaving these lugs loose upon the bolts. The lugs being loose can now be rotated on the bolts bringing the lesser portions thereof into the position occupied by the greater portions of these lugs, thereby permitting removal of the rim retaining ring after which the tire rim with the tire thereon can be removed.

In locking the tire rim on the vehicle wheel the locking levers are pivoted about into locking position and during this action and after reversal of the position of the lugs to bring the retaining ring bearing portions in bearing relation with this retaining ring, the cam edges bear against the lugs clamping the same in retaining position against the retaining ring and felly of the wheel.

While I have shown and described the preferred form of construction of my invention, it is to be understood that various changes may be made in manufacture without departing from the spirit of the invention or the scope of the appended claims.

The invention having been set forth, what I claim as new and useful is:

1. The combination with a felly, a felly band, a tire rim, a rim retaining ring, retaining lugs for the retaining rim, and a lock structure, of a plurality of locking levers, one of said locking levers having an end portion adapted for locked association with the lock structure, corresponding end portions of the other of the locking levers each being adapted to be positioned beneath the adjacent end portion of the preceding locking lever, said locking levers having portions defining cam surfaces adapted for bearing relation with the retaining lugs when said levers are disposed in locking relation with respect to each other for retaining said retaining lugs in operative position on the retaining ring, and means pivotally connecting the locking levers and the retaining lugs to the felly of the vehicle wheel.

2. The combination with a felly of a vehicle wheel, a felly band, a tire rim, a rim retaining ring, and a lock structure associated with the felly, of a plurality of supporting elements associated with the felly, retaining lugs for the retaining ring pivotally supported by the supporting elements and having portions adapted to be clamped into retaining position with respect to the retaining ring, a plurality of levers having corresponding end portions pivotally connected to the supporting elements and defining cam surfaces adapted under certain conditions to have bearing relation with the retaining lugs for forcing said retaining lugs with their portions into clamping relation with respect to the retaining ring and defining contiguous their pivotal end portions spaced ears, one of said levers having an end portion adapted for locking relation with respect to the lock structure, the other of the levers adapted to have their end portions opposite the pivotal end portions disposed beneath the preceding lever between the spaced ears.

3. The combination with a felly of a vehicle wheel, a felly band, a tire rim, a rim retaining ring, and a lock structure associated with the felly, of a plurality of supporting elements associated with the felly, retaining lugs for the retaining ring pivotally supported by the supporting elements and having portions adapted to be clamped into retaining position with respect to the retaining ring, a plurality of levers having corresponding end portions pivotally connected to the supporting elements and defining cam surfaces adapted under certain conditions to have bearing relation with the retaining lugs for forcing said retaining lugs with their portions into clamping relation with respect to the retaining ring, one of said levers having an end portion adapted for locking relation with respect to the lock structure, the other of the levers adapted to have their end portions opposite the pivotal end portions disposed beneath the preceding lever.

4. The combination with a felly, a felly band, a tire rim, a rim retaining ring, retaining lugs for the retaining rim, and a lock structure, of a plurality of locking elements curved in a longitudinal direction to conform when in locking position to the curvature of the felly, one of said locking elements having an end portion adapted for locked association with the lock structure, corresponding end portions of the other of the locking elements each being adapted to be positioned beneath the adjacent end portion of the preceding locking element, said locking elements having portions defining cam surfaces adapted for bearing relation with the retaining lugs when said elements are disposed in locking relation with respect to each other for retaining said retaining lugs in operative position on the retaining ring, and means pivotally connecting the locking elements and the retaining lugs to the felly of the vehicle wheel.

5. A rim fastener including in combination with a rim retaining ring and a felly of a vehicle wheel, of a plurality of rim lugs disposed about the felly having portions in bearing engagement with the retaining ring and the felly, bolt members carried by the felly providing pivotal supports for the rim lugs and having enlarged portions, locking levers pivotally connected to the enlarged portions and having portions operable on the rim lugs for clamping the lugs into bearing relation and having end portions establishing interlocking relation with each other, and locking means having locking relation with one of the locking levers, said one of the locking levers being adapted to control the interlocking relation between the other of the locking levers.

6. A rim fastener including in combination with a rim retaining ring and a felly of a vehicle wheel, of a plurality of rim lugs disposed about the felly adapted for bearing engagement with the retaining ring, fixed members on the felly providing a connection between the felly and the rim lugs, locking levers pivotally connected to the fixed members and disposed circumferentially about the vehicle wheel contiguous of the felly and having interlocking relation with each other and operable upon the rim lugs for moving the rim lugs into bearing relation with the retaining ring, and locking means having locking relation with one of the locking levers, said one of the locking levers being adapted to control the interlocking relation between the other of the locking levers.

In testimony whereof I affix my signature.

HAROLD W. BERGMANN.